United States Patent [19]
Kabelitz et al.

[11] 4,128,248
[45] Dec. 5, 1978

[54] SHAFT SEAL

[75] Inventors: Hans-Peter Kabelitz, Cologne; Nikolas Sideris, Cologne-Weidenpesch, both of Fed. Rep. of Germany

[73] Assignee: Leybold-Heraeus GmbH & Co. KG, Cologne, Fed. Rep. of Germany

[21] Appl. No.: 804,017

[22] Filed: Jun. 6, 1977

[30] Foreign Application Priority Data

Jun. 4, 1976 [DE] Fed. Rep. of Germany ....... 2625153

[51] Int. Cl.² .............................................. F16J 15/54
[52] U.S. Cl. ........................................ 277/15; 277/59
[58] Field of Search .................... 277/3, 27, 15, 59, 72

[56] References Cited

U.S. PATENT DOCUMENTS

| 3,268,232 | 8/1966 | Richards | 277/27 |
| 3,625,523 | 12/1971 | Gardner | 277/59 |
| 3,733,145 | 5/1973 | Kaplansky et al. | 277/15 |
| 3,740,057 | 6/1973 | Doyle | 277/27 |
| 3,740,058 | 6/1973 | Gardner et al. | 277/27 |
| 3,810,634 | 5/1974 | Hakanasson | 277/15 |
| 3,871,666 | 3/1975 | Franz | 277/59 |
| 4,010,960 | 3/1977 | Martin | 277/59 |

FOREIGN PATENT DOCUMENTS 861557 2/1961 United Kingdom ...................... 277/15

Primary Examiner—Robert I. Smith
Attorney, Agent, or Firm—Spencer & Kaye

[57] ABSTRACT

A dynamic packing for sealing a shaft which passes through a wall separating an oil-containing space from an oil-free space or from the outside atmosphere, composed of two shaft sealing rings which engage the shaft and define an oil-filled gap therebetween, and a duct composed of one portion in communication with the oil-containing space and another portion in communication with the gap to place the gap between the sealing rings in communication with the oil-containing space and which is provided with a closure element in the form of a diaphragm having one of its faces in communication with both duct portions, the duct and element being provided to relieve the pressure in the gap.

4 Claims, 1 Drawing Figure

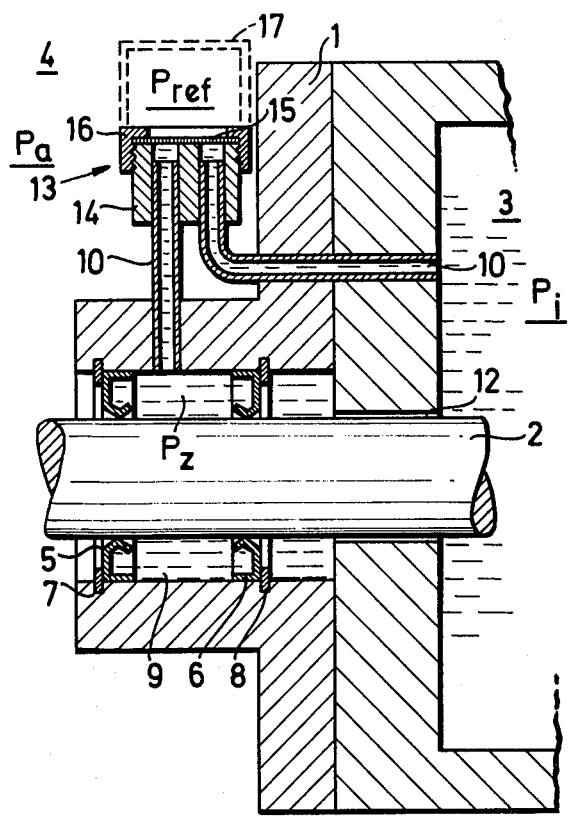

SHAFT SEAL

BACKGROUND OF THE INVENTION

The present invention relates to dynamic packings for sealing a shaft which passes through a wall, and particularly to packings of the oil seal type.

In rotating vacuum pumps and compressors it is necessary to dynamically seal the drive shaft which extends through the casing. This is usually achieved by means of a radial sealing ring of commercial design. The lubrication and cooling of the radial sealing ring are effected by oil which passes to the sealing ring from the interior of the pump. As a rule, the pressure at the outside is lower than that within the particular machine. These pressure conditions and the requirements as regards the tightness of the seal determine the position in which the radial sealing ring is fitted, its sealing lip extending in the direction in which pressure increases since the sealing ring will only provide an effective seal in this position. If the ring is fitted in the reversed position, the lip tends to lift away from the shaft and therefore does not maintain a seal.

For the purpose of providing a particularly good seal for such a shaft, it is known to use two radial sealing rings arranged so that their lips extend toward one another, and to fill the gap between the two lips with oil so as to lubricate and cool the rings in a satisfactory manner. Because of viscous flow phenomena in the conical gap formed between each radial sealing ring and the shaft, oil can be carried into the gap. This phenomenon is present even when the shaft, as recommended by manufacturers, is smooth-finished by means of a rolling pass for instance, i.e. even when its surface does not contain very fine grooves resembling a screw-thread.

The resulting pumping action of the rings often results in the build-up of considerable oil pressures of up to several bars in the gap between the two sealing rings, these pressures resulting in increased differential pressure loading and therefore in premature wear and premature leakage through the radial sealing rings.

To avoid these disadvantages it has been proposed to relieve the annular gap of pressure by discharging the pressurizing medium outwardly via a balance hole. However, pressure-relief of this kind cannot be carried out in the case of pumps or compressors that handle toxic or radioactive gases and that therefore must be particularly tightly sealed, since such gases would escape with the outflowing oil. Furthermore, this method of relieving pressure is not suitable in the case of pumps and compressors in which the internal pressure is substantially higher than the external pressure since when, for example, the pressure in the interior of the pump is substantially higher than the atmospheric pressure, the radial sealing ring closer to the interior of the pump opens so that the oil and the medium being conveyed are able to escape from the pump in considerable quantities by way of the balance hole.

These disadvantages can be avoided by the provision of a shaft seal of the type disclosed in German Patent Specification No. 858,483 wherein the gap formed between the shaft sealing rings communicates by way of a duct with the space containing the oil. Thus, the oil emerging from the gap flows back into the oil-containing space without passing into the atmosphere, so that the contamination of the atmosphere with contaminated oil cannot occur.

It is also known to evacuate pumps or compressors for toxic, radioactive or high-purity media prior to their use and to examine them for leaks. Also, evacuation is often carried out when cleaning such equipment for the purpose of degassing the walls and the lubricant. Under these pressure conditions, where the internal pressure of the particular machine is lower than the atmospheric pressure, the shaft seal disclosed in German Patent Specification No. 858,483 is unable to meet the stringent requirements regarding tightness. As soon as the machine is evacuated, negative pressure is also set up in the gap between the sealing rings by way of the balance hole, so that the sealing ring which is closer to the atmosphere opens and atmospheric air is able to enter the machine through the duct.

SUMMARY OF THE INVENTION

It is therefore an object of this invention to provide a novel and improved shaft packing based on two shaft sealing rings enclosing an oil-filled gap which avoids the above disadvantages of the prior art.

It is another object of the invention to provide a novel and improved shaft packing which is particularly suitable for use in pumps and compressors and which is able to meet stringent requirements of tightness, so that pumps or compressors equipped therewith can be used for handling toxic and radioactive gases even under widely varying pressure loads.

It is a further object of this invention to provide a shaft packing which includes means for relieving the pressure in the gap.

Briefly stated, a dynamic packing for a shaft according to the invention is provided with two duct portions each communicating with a respective one of the oil-containing space and the gap, and with a closure element in the form of a diaphragm disposed with one of its faces in communication with both duct portions for closing the duct against passage of oil therethrough as required. Such closure element represents an extremely simple and effective solution to the problem of operating a machine fitted with a shaft packing according to the invention at an internal pressure in the oil-containing space lower than atmospheric.

If the machine is operated with an internal pressure higher than atmospheric pressure, then the closure element can open. Stringent requirements regarding tightness of the seal can then be met. If the internal pressure of the machine becomes lower than atmospheric pressure or the external pressure, then the closure element will close the duct. In this way the establishment of a negative pressure in the space between the sealing rings is avoided so that it is not possible for the atmospheric or external pressure to force air into this space.

In some practical cases, e.g. when pumps or compressors are used in self-contained circulatory systems in which the machines often do not operate against atmospheric pressure, it may be advantageous if the pressure in the interior of the machine is compared not with the atmospheric pressure, but with a reference pressure corresponding to that of the self-contained circulatory system. In such cases it may also be advantageous to take into account the pressure in the gap between the two sealing rings. Only then is it possible to avoid the various pressure conditions which adversely affect the seal, i.e. excessively high or excessively low pressure in the gap between the sealing rings.

BRIEF DESCRIPTION OF THE DRAWING

The sole FIGURE is a diagrammatic, cross-sectional, detail view of one embodiment of a dynamic shaft packing according to the invention.

DESCRIPTION OF THE PREFERRED EMBODIMENTS

The FIGURE shows a separating, or container, wall 1 and a rotary shaft 2 of a machine which is not further illustrated. The shaft 2 extends through the separating wall 1 which separates an oil-containing space 3 at a pressure $P_i$ from an oil-free space 4 at a pressure $P_a$. Generally, the space 4 will be the atmosphere, and the pressure $P_a$ is atmospheric pressure.

Sealing means are provided to seal the shaft 2 in the separating wall 1 and include two radial sealing rings 5 and 6 engaged between the shaft 2 and the wall 1. As shown, the rings 5 and 6 are lipped, and the lip of each ring faces the other ring. Retaining rings 7 and 8 are provided to prevent the sealing rings 5 and 6 from sliding away from one another axially beyond their predetermined separation at which an annular gap 9 is created between the sealing rings 5 and 6.

The space 3 is in communication with the gap 9 by way of a duct 10 which is formed by holes machined in the separating wall 1 and conduits, whereby the gap 9 is filled with oil at a pressure $P_z$. Thus, in the case where $P_i$ is greater than $P_a$, it is possible to avoid an excessive rise in the oil pressure $P_z$ in the annular gap 9 that would lead to premature wear and premature leakage, particularly through the radial sealing ring 5, which excessive pressure rise would be produced by the pumping action of the radial sealing ring 6 in the absence of the flow path provided by duct 10.

According to the invention, means are provided for closing the duct 10 when required.

The separating wall 1 is shown as part of the casing of a pump e.g. of a vacuum pump. The shaft 2 is mounted in the pump casing with the aid of slide bearings 12. A pressure-responsive closure element 13 is interposed in the duct 10 connecting the gap 9 between the sealing rings 5 and 6 to the space 3 within the pump. The element 13 is composed of a body 14 into which run upwardly extending duct portions constituted by conduits, one portion leading to the gap 9 and the other to the space 3 within the pump. These duct portions extend right through the body 14 to the upper face thereof. The upper face of the body 14 is covered by a resilient diaphragm 15 which controls communication between the respective duct portions within the body. The diaphragm 15 is secured to the body 14 by a threaded cap 16 having an opening in its top.

If the pressure $P_i$ in the space 3 within the pump is greater than the external pressure applied to the uncovered side of the diaphragm 15, the diaphragm no longer bears firmly against the upper face of body 14 and communication is established between the two duct parts, i.e. the duct 10 opens. If the internal pressure $P_i$ is lower than the external pressure, diaphragm 15 is pressed firmly against the upper face of body 14 so that the duct 10 is closed.

This arrangement offers the further advantage that if, independently of the internal pressure $P_i$, the pressure $P_z$ in the gap 9 rises to any considerable extent, thus creating the risk of excessive wear on the outer sealing ring 5, this pressure itself causes opening of duct 10, thereby relieving the pressure since medium can then flow from gap 9 into the space 3 within the pump by way of the closure element 13.

As already mentioned, it may be expedient in some cases to make use of a reference pressure other than atmospheric pressure. For this purpose, the space above the diaphragm 15 can be formed as a closed chamber by means of a casing 17, shown in broken lines, the required reference pressure $P_{ref}$ being established in this chamber.

The rings 5 and 6 are of the lip-washer or Simmer-ring type.

It will be understood that the above description of the present invention is susceptible to various modifications, changes and adaptations, and the same are intended to be comprehended within the meaning and range of equivalents of the appended claims.

What is claimed is:

1. A dynamic packing for sealing a shaft which passes through a wall separating an oil-containing region from an oil-free region, comprising: means defining a cylindrical passage through which the shaft extends; two shaft sealing rings disposed in said passage for engagement with the shaft locations spaced along the shaft axis to define therebetween an annular oil-filled gap; means defining a duct composed of one portion communicating with the oil-containing region and another portion communicating with said gap, for placing said gap in communication with the oil-containing space; and closure means composed of a body into which both of said duct portions extend, and a diaphragm disposed with one of its faces in communication with both of said duct portions for selectively blocking passage of oil through said duct in order to selectively control fluid communication between said duct portions.

2. An arrangement as defined in claim 1 wherein said diaphragm has its other face exposed to atmospheric pressure.

3. An arrangement as defined in claim 1 further comprising a fluid-tight chamber disposed above said body in communication with the other face of said diaphragm and filled with a gas at a selected reference pressure.

4. An arrangement as defined in claim 1 wherein said closure means are responsive to the pressures in the oil-containing and oil-free regions for opening said duct when the pressure in the oil-containing region is greater than that in the oil-free region.

* * * * *